United States Patent [19]

Hicks

[11] Patent Number: 5,618,231

[45] Date of Patent: Apr. 8, 1997

[54] CONVEYOR SYSTEM FOR FISH MACHINE PROCESSING

[75] Inventor: Timothy S. Hicks, Seattle, Wash.

[73] Assignee: Flohr Metal Fabricators, Inc., Seattle, Wash.

[21] Appl. No.: 541,527

[22] Filed: Oct. 10, 1995

Related U.S. Application Data

[62] Division of Ser. No. 324,880, Oct. 17, 1994, Pat. No. 5,480,347.

[51] Int. Cl.⁶ .................................................. A22C 25/08
[52] U.S. Cl. ............................ 452/177; 452/170; 452/180
[58] Field of Search ................................. 452/177, 183, 452/170, 166, 180

[56] References Cited

U.S. PATENT DOCUMENTS

| | | | |
|---|---|---|---|
| 2,433,460 | 12/1947 | Kurzbin | 452/166 |
| 2,507,810 | 5/1950 | Oates | 452/170 |
| 2,529,800 | 11/1950 | Erickson | 452/170 |
| 4,107,904 | 8/1978 | Helgesen | 53/142 |
| 4,321,729 | 3/1982 | Ollik | 452/170 |
| 4,463,478 | 8/1984 | Hartmann et al. | 452/170 |
| 4,528,720 | 7/1985 | Young et al. | 83/95 |
| 4,733,518 | 3/1988 | Griesdorn | 53/444 |
| 5,299,975 | 4/1994 | Meyn | 451/177 |

*Primary Examiner*—Willis Little
*Attorney, Agent, or Firm*—Seed and Berry LLP

[57] ABSTRACT

A fish processing machine has a deheading station and a finishing station at which the throat tissue of the deheaded fish is removed. These stations are located on a reciprocating carriage in conjunction with a main body conveyor, a head positioning conveyor and a hold-down conveyor which are continuously advancing and positioning the fish being processed. The head positioning conveyor has head and tail sprockets and has head positioning pins which are in engagement with the heads of conveyed fish behind the deheading station. These pins are swing-mounted so that they will remain in upright position as they are withdrawn from the fish heads while passing over the front quadrant of the head sprocket before the fish heads reach the deheading station.

9 Claims, 3 Drawing Sheets

CONVEYOR SYSTEM FOR FISH MACHINE PROCESSING

CROSS-REFERENCE

This application is a division of application Ser. No. 08/324,880, filed Oct. 17, 1994, now U.S. Pat. No. 5,480,347.

TECHNICAL FIELD

The present invention relates to fish-processing machines of the type in which fish are deheaded and then the throat tissue of the deheaded fish is cut free from the body in a continuous process while the fish are conveyed. More particularly, the invention relates to an improved conveyor system in such a machine.

BACKGROUND OF THE INVENTION

As indicated in FIGS. 1–2, a prior art fish processing machine has a main conveyor 18 with sets of flight pins 20–21 at regular intervals for conveying fish from a loading station 22 to a discharge station 23 while they are being processed. A fish hold-down conveyor 24 travels over the main conveyor through part of its travel to keep the fish from shifting position while they are being deheaded by a guillotine blade 25 and then have their throat tissue cut by a rotary tool 26. The blade 25 and the throat cutting tool 26 are both rigidly mounted on the frame of the machine, and the lower run of the hold-down conveyor 24 is engaged by four spring-loaded hold-down rollers 27–30 swing mounted to the machine frame.

A pin chain 31 is mounted alongside part of the length of the main conveyor 20 and presents a series of rigidly mounted head-positioning pins 32 on a conveyor chain to engage the fish behind the gills in its gill opening when they are positioned crosswise to the main conveyor 18 with their heads projecting over the pin chain. The main conveyor 18, hold-down conveyor 24 and pin chain 31 are driven by a sprocket and chain drive at the same speed by a motor 34 having a variable speed drive for discontinuous operation so that the fish can be stationary while being processed by the guillotine blade and throat cutting tool.

The discontinuous motion of the described prior art machine makes operation on fish of varying sizes difficult due to the disturbance caused to the position of the fish by stopping and starting the conveyor. Small fish, which by the nature of the mechanism are less securely held than large fish, are apt to be disturbed more than the large ones. The result is an unacceptable variance between the head cuts of large and small fish. Because the head positioning pins 32 mounted on the pin chain 31 change orientation as they start around the head sprocket for the pin chain, they tend to push the head of a conveyed fish forwardly relative to the main conveyor as that fish advances beyond the pin chain. Because a small fish has less room in its gill opening to accommodate this relative motion, a small fish is affected more than a large one. The result further contributes to an unacceptable variance between the head cuts of large and small fish.

SUMMARY OF THE INVENTION

Deficiencies in the prior art processing machine are corrected in part by mounting the deheading and throat cutting apparatus on a shuttle carriage which reciprocates along the longitudinal axis of the machine in an advance and return cycle with a period equal to the time that it takes for the main conveyor to advance the distance between adjacent sets of fish positioning pins. The shuttle carriage is driven with a mechanical crank off of the main conveyor drive system. The geometry is such that the motion of the carriage remains synchronized with the conveyor regardless of conveyor speed.

In accordance with the present invention head positioning pins are pivotally mounted onto a head positioning roller chain traveling alongside the main conveyor such that the pins are unconstrained as the chain moves about its head sprocket with the result that no motion relative to the main conveyor is imparted to the fish engaged by the pins as the chain and the fish separate in advance of a guillotine unit on the shuttle carriage.

DETAILED DESCRIPTION OF THE INVENTION

In the present instance a person standing at the loading station 22 looking along the main conveyor toward the discharge station 23 will be considered to be looking in a forward direction, and the right and left sides of the conveyors and the machine shall be considered to be those at the right and left of such a person.

Figure 1:
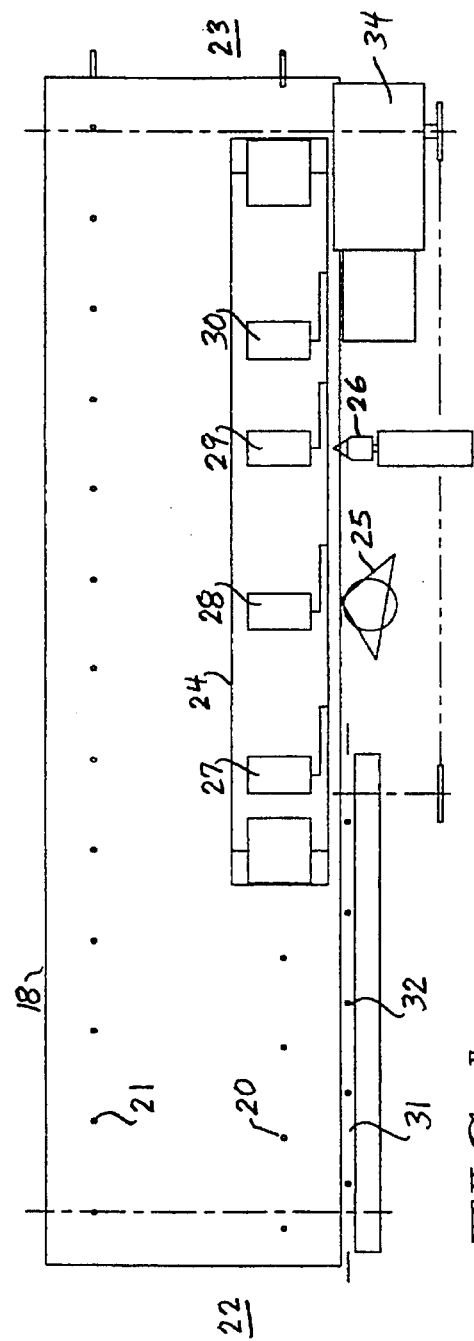
FIGS. 1 and 2 are plan and elevational schematic views, respectively, of a prior art machine.
Figure 2:
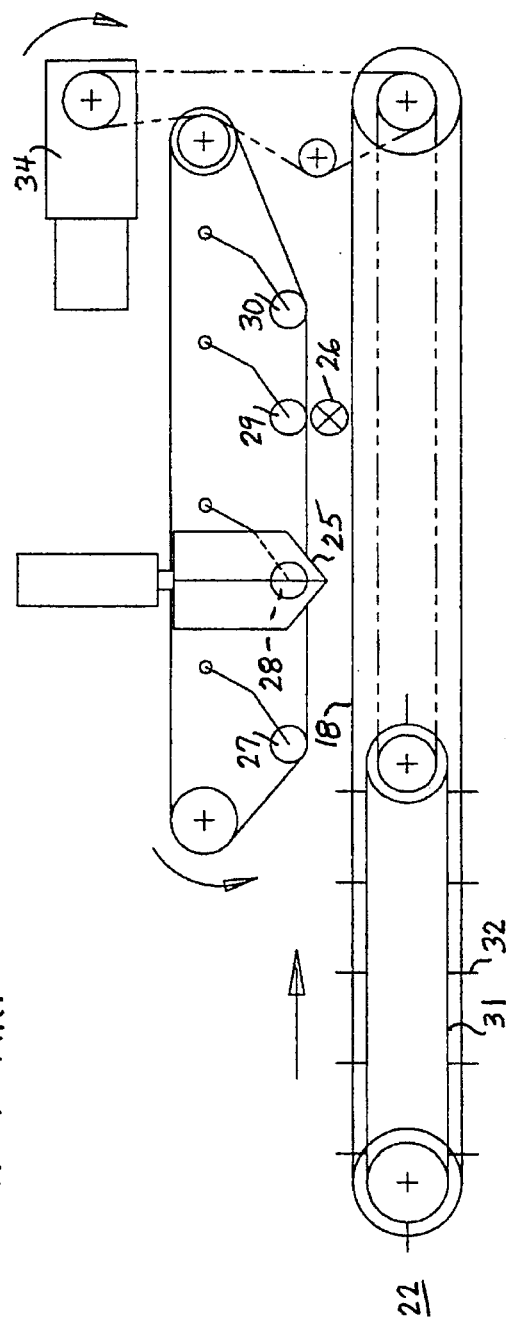
Figure 3:
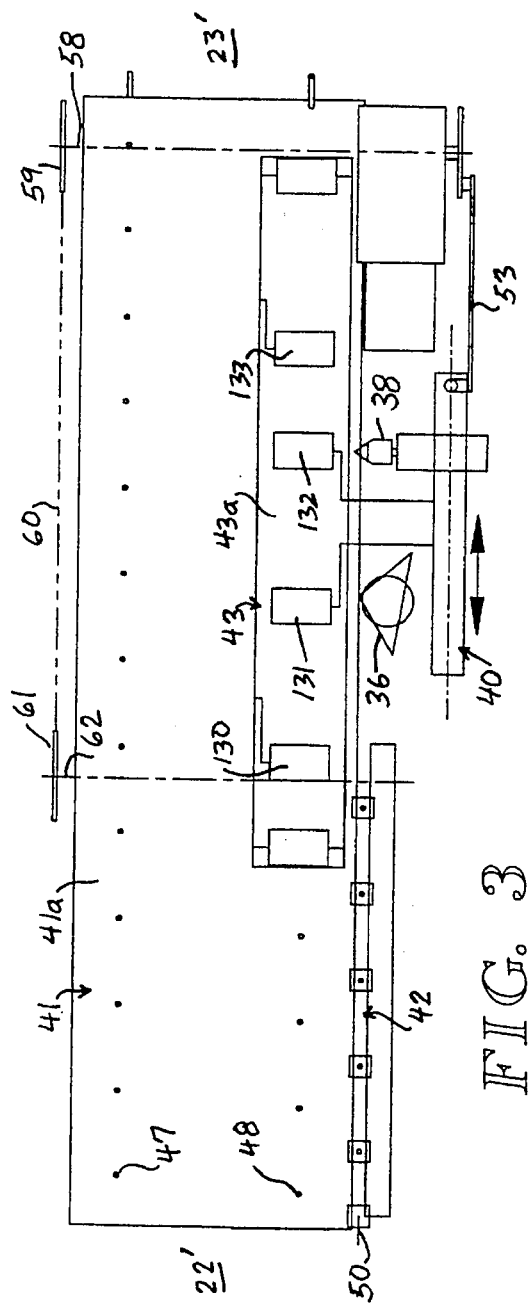
FIGS. 3 and 4 are plan and elevational schematic-views, respectively, of a machine embodying the present inventions.
Figure 4:
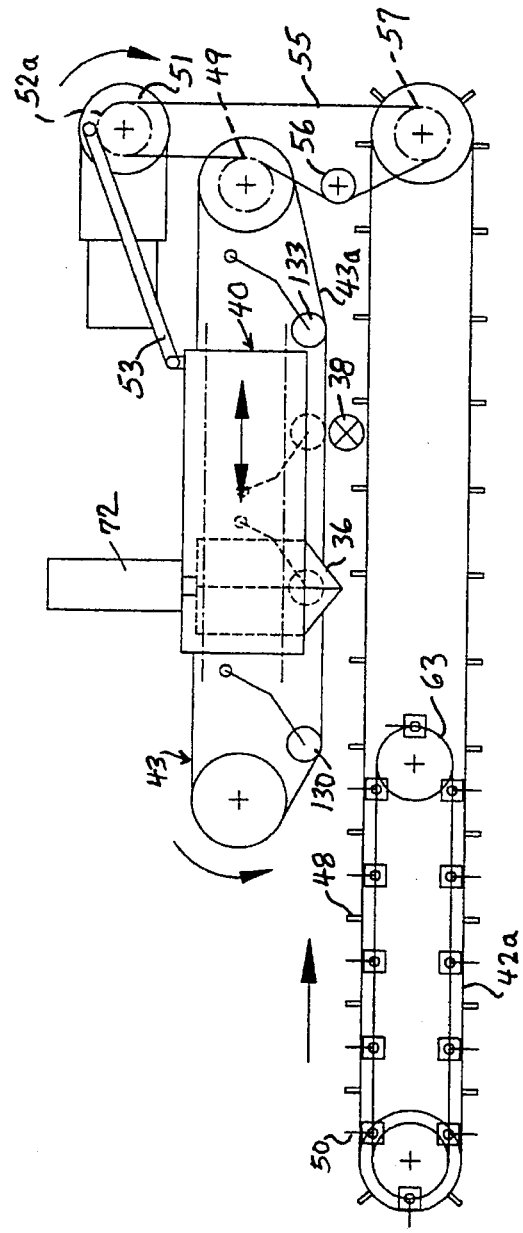

Referring to FIGS. 3–4, the improved processing machine incorporating the present invention conveys each fish along a linear processing path with the fish positioned transversely of the path as in the prior art. As the fish progresses along the path a vertically moving guillotine blade 36 operated by a pneumatic cylinder unit 72 severs the head while supported on an anvil at a deheading station. Then a rotary finishing tool 38 advances axially into the gullet of the fish to sever the throat tissue at a finishing station. Unlike the prior art machine, the guillotine blade and finishing tool operate on the fish while the fish is being conveyed, and this is accomplished by mounting the anvil and operating mechanisms for the guillotine blade and finishing tool on a reciprocating shuttle carriage 40 which moves parallel to the linear processing path.

The processing machine has three conveyors, namely, a main fish-body transporting conveyor 41, a secondary head-positioning conveyor 42, and an overhead hold-down conveyor 43 all moving at the same speed. The main conveyor 41 has an endless belt 41a extending from a rear loading station 22' to a front discharge station 23' and the secondary head positioning conveyor 42 has an endless chain 42a extending alongside the main conveyor from the rear loading station to an intermediate position spaced behind the guillotine blade 36. The overhead conveyor 43 has an endless belt 43a positioned above a right hand portion of the main conveyor and extends from a position slightly aft of the head of the secondary conveyor 42 to the unloading station.

The lower run of the hold-down conveyor 43 is pressed downwardly by spring-loaded hold-down rollers 130–133. Rollers 130 and 133 are swing-mounted on the machine frame and hold-down rollers 131–132 are carried by the carriage 40. The shuttle carriage 40 is synchronized with the three conveyors 41–43 and is slide-mounted on a pair of horizontally spaced guide rods 45–46 supported by the machine frame to position the shuttle frame above and to the right of the main conveyor 41.

As in the prior art machine, the main conveyor has fish positioning flights which may be comprised of sets of left and right body positioning pins 47–48. These body positioning pins are complemented by head positioning pins 50 on the head-positioning conveyor 42 which are positioned slightly in advance of respective of the sets of pins on the main conveyor. All pins are spaced apart along the machine at the same interval, hereinafter referred to as the "conveyor pitch". The shuttle carriage 40 cycles in forward and return strokes in a total cycle period equal to that required for the conveyors to advance the distance of a conveyor pitch. This is a fixed relationship ,and is established by mounting a crank disc 51 to the drive sprocket 52a on the output shaft of a stationary motor for powering the conveyor system. Referring to FIGS. 3 and 4, the crank disc 51 is coupled by a connecting rod 53 to the frame of the shuttle carriage 40, and the drive sprocket 52a is coupled to head sprockets 49, 57 for both the overhead conveyor 43 and the main conveyor 41, respectively, by an endless chain 55 which is tensioned by an idler 56. The chain 55 engages the front side of the head sprocket 49 for the overhead conveyor 43 and engages the underside of the head sprocket 57 of the main conveyor 41 so that these two conveyors operate in the same direction.

Referring to FIG. 3, the left end of the head shaft 58 of the main conveyor 41 has a sprocket 59 driving a chain 60, to an intermediate sprocket 61 on a head shaft 62 for the secondary conveyor 42 whereby the secondary conveyor is driven in unison with the main conveyor. The ratio of the drive sprocket 52 to the driven sprockets is selected so that a single revolution of the drive sprocket 52a and crank disc 51 will advance the main and overhead conveyors 41, 43 in a conveyor single pitch. The throw of the crank disc 51 is such that the shuttle carriage 40 advances and returns through a complete cycle in time with the travel of one pitch of the main conveyor 41.

Figure 5:
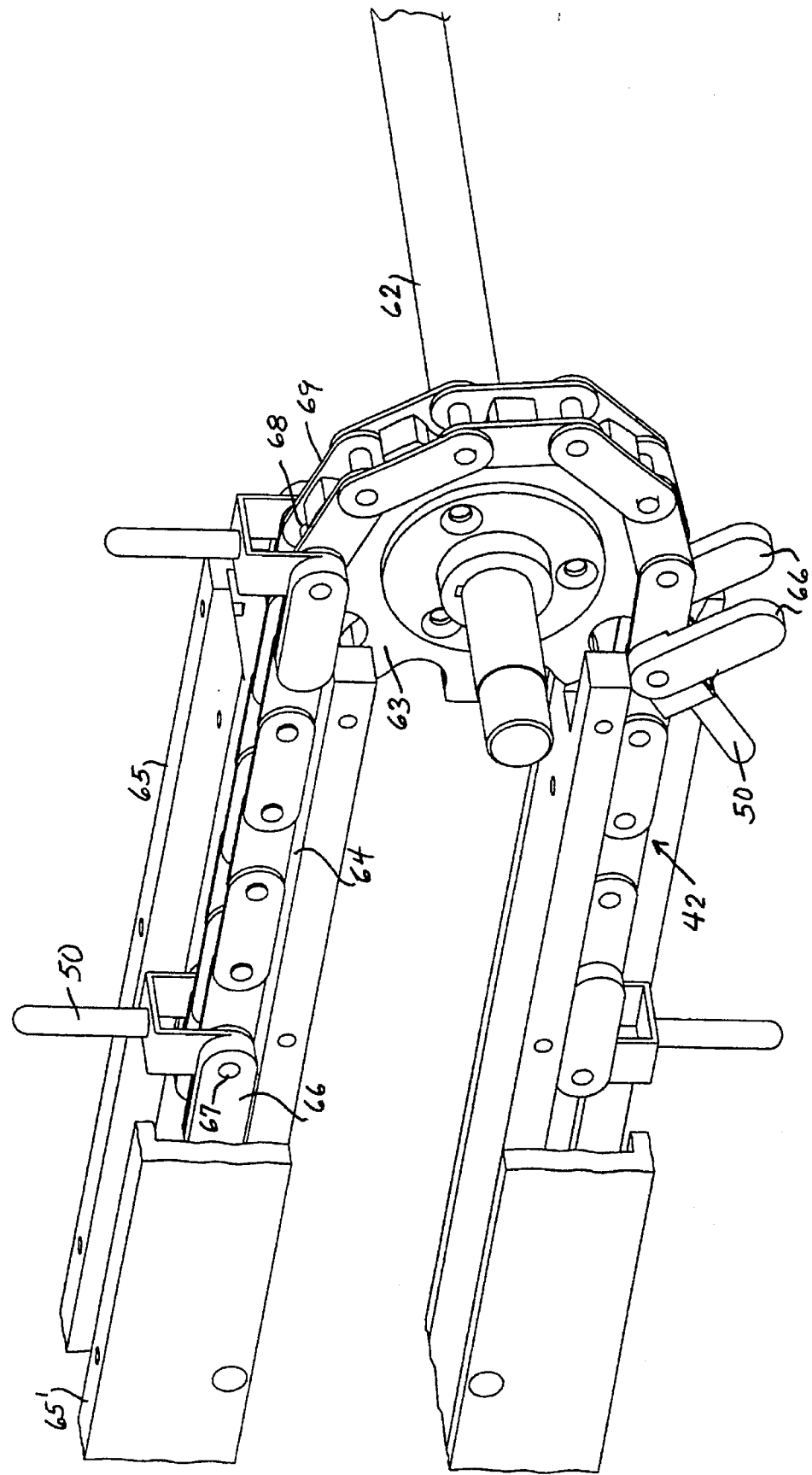
FIG. 5 is a fragmentary isometric view of the head positioning conveyor of the present invention as seen from the right side of the machine.

The pins 47–48 on the main conveyor 41 project from mounting plates fixed to the conveyor belt 41a. On the other hand, as shown in FIG. 5, the pins 50 on the head-positioning conveyor 42 are swing-mounted on the conveyor 42 so that they not only project upwardly during their travel along the upper run of the conveyor, but also are permitted to remain in upwardly projecting position as they pass around the upper forward quadrant of the head sprocket 63 of the head-positioning conveyor 42 rather than extending radially with respect to the head sprocket as they pass around this upper forward quadrant. In the preferred embodiment this is accomplished by pin positioning means providing a track 64 beneath a pair of laterally spaced head support strips 65–65' extending alongside the upper run of the head positioning conveyor 42 for receiving a pair of arms 66 fixed in trailing relation to each head positioning pin 50. Each such pin and arm assembly is a unit pivotally mounted by way of a pivot pin 67 extending through a hollow pin 68 which interconnects the links 69 on the conveyor chain. In the alternative, for example, the head positioning pin 50 can be fixed to one leaf of a hinge having its other leaf fixed to the conveyor links 69 such that the hinge pin for the hinge is positioned in trailing relation to the head positioning pin.

Having the head positioning pins 50 on the conveyor 42 remain in an upwardly extending position as they pass around the upper forward quadrant of the head sprocket 63 permits the pins 50 to lower vertically out of engagement with the conveyed fish so that the fish remain in the preset position on the main conveyor 41 as they are engaged by the hold-down conveyor 43 and their heads slide along the anvil of the guillotine unit in advance of the guillotine 36. This arrangement is a distinct improvement over the previously described prior art machine in which the head positioning pins tended to move the fish as the pins lowered while passing around the forward sprocket of the head positioning conveyor.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. A conveyor system comprising:

head and tail rotors, an endless conveyor passing over said rotors and having a forwardly moving upper run and a lower return run between said rotors, a pin providing unit on said conveyor having a positioning pin arranged to project upwardly above said conveyor during said upper run to interfit with an object being conveyed, said pin providing unit being swing-mounted on said conveyor such that said pin can remain in upwardly projecting position while passing over the upper forward facing quadrant of said head rotor and lowering from engagement with the conveyed object, and pin positioning means arranged to be operate with said pin providing unit while it is traveling along said upper run for keeping the pin in said upwardly projecting position while the pin is traveling the path of said upper run and to be disengaged by said pin providing unit when said pin reaches said heat rotor quadrant.

2. A conveyor system according to claim 1 in which said object is a fish and said pin is adapted to fit into the opening behind a gill of said fish to position the head of the fish.

3. A conveyor system in accordance with claim 1 in which there are a plurality of said pin providing units evenly spaced apart along said conveyor and said pin positioning means includes a track beside said upper run arranged to be engaged by said pin providing units as they travel along said upper run.

4. A conveyor system according to claim 1 in which a second endless conveyor having upper and lower runs extends with its upper run alongside said upper run of the first mentioned conveyor for conveying part of said object, and a drive mechanism for driving said conveyors at the same speed.

5. A conveyor system according to claim 4 in which said second conveyor is adapted to convey a fish on its upper run while the head of the fish is positioned by said pin.

6. A conveyor system according to claim 1 in which said rotors are sprockets and said conveyor has links interfitting said sprockets.

7. A fish conveyor system comprising:

a first conveyor having an endless conveyor belt with a fish transporting upper run and a lower return run, a set of spacer elements projecting outwardly from said belt at regular intervals along its length for engaging the back of a transported fish;

a second conveyor running alongside the first conveyor through part of the length of the first conveyor and having an endless conveyor with an upper run and a lower return run;

a set of pin providing units pivotally mounted on said second conveyor at regular intervals matching the intervals of the set of spacer elements;

each of said units having a head positioning pin arranged to project upwardly above the level of said fish transporting upper run when traveling beside it to assist in positioning a transported fish in conjunction with a respective said spacer element;

said pins being swingably mounted relative to said conveyor such as to be upright during the upper run of said second conveyor to project upwardly in the space behind a gill of a conveyed fish, and to be permitted to remain upright while lowering out of contact with a fish while said units move downwardly from the upper run of the second conveyor toward the lower run of the second conveyor;

a guide track beside said upper run cooperating with said units for restricting pivotal movement of said pins while the units are traveling said upper run; and a drive mechanism for advancing said conveyors at the same speed.

8. A fish conveyor system according to claim 7 in which each of said units has a side arm rigidly connected to a respective said pin; and said guide track being arranged to guide said side arms to hold said pins in an upright position while traveling the path of the upper run of the second conveyor, said arms being free of said guide track at the head of the second conveyor whereby said holders are free to swing relative to said conveyor chain such as to permit each pin to remain upright relative to said level of the fish transporting upper run until the pin moves downwardly below such level.

9. A fish conveyor system according to claim 8, including a slide surface forwardly of said upper run of the second conveyor for supporting the head of a conveyed fish after it has advanced beyond the second conveyor, including an upper conveyor spaced above said first conveyor and arranged to press down on a fish being transported by said first conveyor when said pins lower beneath the level of said slide surface and to hold the fish in position relative to said belt of the first conveyor, and including a drive mechanism for moving said upper conveyor at the same speed as said first conveyor.

* * * * *